United States Patent

Nozaki et al.

[11] Patent Number: 6,150,448
[45] Date of Patent: Nov. 21, 2000

[54] FLAME RETARDANT FOR MESH SHEETS AND FLAMEPROOF MESH SHEET INCLUDING THE SAME

[75] Inventors: Saiji Nozaki, Toyama; Kuniaki Kamiya, Osaka, both of Japan

[73] Assignees: Kyowa Kabushiki Kaisha; Saiji Nozaki, both of Japan

[21] Appl. No.: 09/215,247

[22] Filed: Dec. 18, 1998

[30] Foreign Application Priority Data

Dec. 18, 1997 [JP] Japan ................................. 9-369954

[51] Int. Cl.[7] .............................. C08K 3/02; C08K 5/521
[52] U.S. Cl. ..................... 524/414; 524/416; 524/415; 524/503; 524/507; 524/707; 428/289; 428/290; 8/490; 252/609; 252/606; 526/329.5; 525/127
[58] Field of Search ...................... 524/416, 415, 524/80, 503, 507, 707; 528/289; 428/290, 921; 8/490; 252/609, 606; 526/329.5; 525/127

[56] References Cited

U.S. PATENT DOCUMENTS

| | | | |
|---|---|---|---|
| 4,762,750 | 8/1988 | Girgis et al. | 428/378 |
| 4,762,751 | 8/1988 | Girgis et al. | 428/378 |
| 4,877,823 | 10/1989 | Plachetta et al. | 524/80 |
| 5,279,878 | 1/1994 | Fottinger et al. | 428/102 |
| 5,286,576 | 2/1994 | Srail et al. | 428/517 |
| 5,486,398 | 1/1996 | Weber et al. | 428/95 |
| 5,501,879 | 3/1996 | Murayama | 427/381 |

FOREIGN PATENT DOCUMENTS

| | | |
|---|---|---|
| 0 505 940 | 9/1992 | European Pat. Off. . |
| 0 546 841 | 6/1993 | European Pat. Off. . |
| 52-41786 | 10/1977 | Japan . |
| 53-18065 | 5/1978 | Japan . |
| 58-104935 | 6/1983 | Japan . |
| 61-9430 | 3/1986 | Japan . |
| 61-223045 | 10/1986 | Japan . |

OTHER PUBLICATIONS

Encyclopedia of Chemical Technology, 4th Ed., vol. 10, Kroschwitz et al. John Wiley & Sons, p. 665, 1993.
Sekisui, "Fire Retard Polyolefin Composition Copmprise Polyolefin Red Phosphorus Ammonium Phosphate," Patent Abstracts of Japan (Oct. 3, 1986).
A. Kanayama, et al., "Recent Trend on Red Phosphorus Group Flame Retardant," Japan Plastics, vol. 42, No. 2, pp. 74–80 (Feb., 1991).

*Primary Examiner*—Robert Dawson
*Assistant Examiner*—Kuo-Liang Peng
*Attorney, Agent, or Firm*—Rader, Fishman & Grauer

[57] ABSTRACT

A flame retardant including red phosphorus in an amount of 1.5 to 15 parts by weight and an ammonium polyphosphate compound in an amount of 10 to 70 parts by weight, based on 100 parts by weight of the solid content of an aqueous dispersion of an ethylene-vinyl acetate-acrylate copolymer having an ethylene content of 2 to 30 wt %, a vinyl acetate content of 40 to 88 wt %, an acrylate content of 10 to 50 wt % and a resin solid content of 35 to 75 wt %. The flame retardant is useful to flameproof mesh sheets.

14 Claims, No Drawings

FLAME RETARDANT FOR MESH SHEETS AND FLAMEPROOF MESH SHEET INCLUDING THE SAME

BACKGROUND OF THE INVENTION

1. Field of the Invention

The present invention relates to a halogen-free flameproof mesh sheet used outdoors, such as at a construction site for a long time.

2. Description of the Related Art

In recent years, there has been a trend toward the construction of buildings having a large number of stories in the construction industry. Meanwhile, there has been an increase in the number of houses having a small number of stories. Flameproof mesh sheets for safety and protection, flameproof mesh sheets for houses having a small number of stories, and scattering prevention flameproof mesh sheets must be laid in these buildings and regulations are becoming more and more strict.

Currently used flameproof mesh sheets and scattering prevention flameproof mesh sheets are produced by weaving yarn prepared by coating a polyester, nylon, or polypropylene multi-filament fiber with a vinyl chloride-based paste resin composition and heating and then heating the obtained cloth; and by coating a fabric prepared by weaving and processing a multi-filament fiber with a vinyl chloride-based paste resin composition, heating and processing to a desired shape.

The resin composition for coating a fiber and fabric comprises a vinyl chloride resin containing chlorine as a resin and a chlorine-based flame retardant such as chlorinated paraffin, bromine-based flame retardant such as decabromodiphenyl oxide, or inorganic flame retardant such as antimony trioxide (See Examined Japanese Patent Publication Nos. 52-41786, 53-18065 and 61-9430, Plastics, February, 1991).

In recent years, it has been globally demanded to avoid the use of resins and flame retardants containing elemental halogen which generates harmful gas at the time of combustion from the viewpoint of the environmental preservation of the earth.

Japanese Laid-open Patent Application No. 61-223045 proposes that red phosphorus and ammonium phosphate are kneaded into a polyolefin to prevent corrosion by elemental halogen contained in an elemental halogen-containing compound flame retardant. However, there is unknown a flame retardant prepared by dispersing red phosphorus and ammonium phosphate in an aqueous dispersion of an ethylene-vinyl acetate-acrylate copolymer or an aqueous dispersion comprising the aqueous dispersion and an aqueous dispersion of an ethylene-based-αolefin copolymer and/or an aqueous dispersion of a polyurethane.

The inventor of the present invention has proposed in Japanese Laid-open Patent Application No. 9-225464 a halogen-free flame retardant comprising an aqueous dispersion of a polyolefin resin as a flame retardant. This flame retardant has an excellent effect, but there is seen a tendency toward an increase in the viscosity of the flame retardant due to time changes during storage.

SUMMARY OF THE INVENTION

In view of the above situation, it is an object of the present invention to provide a flame retardant for halogen-free flameproof mesh sheets which does not experience a rise in viscosity during storage and does not generate harmful halogen gas at the time of combustion, and a flameproof mesh sheet comprising the same.

The present invention relates to:

(a) A flame retardant for mesh sheets comprising red phosphorus in an amount of 1.5 to 15 parts by weight and an ammonium polyphosphate compound in an amount of 10 to 70 parts by weight based on 100 parts by weight of the solid content of an aqueous dispersion of an ethylene-vinyl acetate-acrylate copolymer having an ethylene content of 2 to 30 wt %, a vinyl acetate content of 40 to 88 wt %, an acrylate content of 10 to 50 wt % and a resin solid content of 35 to 75 wt %.

(b) A flame retardant for mesh sheets prepared by mixing an aqueous dispersion of an ethylene-based α-olefin copolymer having a solid content of 20 to 45 wt % with an aqueous dispersion of an ethylene-vinyl acetate-acrylate copolymer having an ethylene content of 2 to 30 wt %, a vinyl acetate content of 40 to 88, an acrylate content of 10 to 50 wt % and a resin solid content of 35 to 75 wt % in a solid content weight ratio of 10:90 to 70:30 and adding red phosphorus in an amount of 1.5 to 15 parts by weight and an ammonium polyphosphate compound in an amount of 10 to 70 parts by weight based on 100 parts by weight of the total resin solid content.

(c) A flame retardant for mesh sheets prepared by mixing an aqueous dispersion of a polyurethane having a solid content of 25 to 75 wt % with an aqueous dispersion of an ethylene-vinyl acetate-acrylate copolymer having an ethylene content of 2 to 30 wt %, a vinyl acetate content of 40 to 88 wt %, an acrylate content of 10 to 50 wt % and a resin solid content of 35 to 75 wt % in a solid content weight ratio of 10:90 to 90:10 and adding red phosphorus in an amount of 1.5 to 15 parts by weight and an ammonium polyphosphate compound in an amount of 10 to 70 parts by weight based on 100 parts by weight of the total resin solid content.

(d) A flame retardant for mesh sheets prepared by mixing an aqueous dispersion of an ethylene-based α-olefin copolymer having a solid content of 20 to 45 wt % and an aqueous dispersion of a polyurethane having a solid content of 25 to 75 wt % with an aqueous dispersion of an ethylene-vinyl acetate-acrylate copolymer having an ethylene content of 2 to 30 wt %, a vinyl acetate content of 40 to 88 wt %, an acrylate content of 10 to 50 wt % and a resin solid content of 35 to 75 wt % in a solid content weight ratio of 10:10:80 to 50:70:10 and adding red phosphorus in an amount of 1.5 to 15 parts by weight and an ammonium polyphosphate compound in an amount of 10 to 70 parts by weight based on 100 parts by weight of the total resin solid content.

(e) The flame retardant for mesh sheets of any one of (a)–(d), wherein red phosphorus is micro-capsulated.

(f) The flame retardant for mesh sheets of any one of claims (a)–(e), wherein the ammonium polyphosphate compound is micro-capsulated.

(g) The flame retardant for mesh sheets of any one of (a)–(f) which further comprises a metal hydroxide in an amount of 60 to 150 parts by weight based on 100 parts by weight of the solid content of the aqueous dispersion resin of the flame retardant.

(h) The flame retardant for mesh sheets of (g), wherein the metal hydroxide is magnesium hydroxide and/or aluminum hydroxide.

(i) A flameproof mesh sheet woven out of coated yarn which is impregnated with the flame retardant for mesh sheets of any one of (a)–(h) and heated.

(j) The flameproof mesh sheet of (i), wherein the coated yarn is a multi-filament fiber having an equivalent single fineness of 3 to 17 denier, a total fineness of 500 to 4,500 denier, a tensile strength of 6 to 10 g/denier and an elongation at break of 14 to 45%.

(k) A flameproof mesh sheet prepared by impregnating a mesh sheet fabric woven out of multi-filament fibers with the flame retardant for mesh sheets of any one of (a)–(h) and heating.

(l) The flameproof mesh sheet of (k), wherein the mesh sheet fabric woven out of multi-filament fibers is a plain weave fabric woven out of synthetic fibers having an equivalent single fineness of 2 to 13 denier, a total fineness of 150 to 2,500 denier, a tensile strength of 6 to 10 g/denier and an elongation at break of 14 to 45%, or leno weave fabric or imitation gauze woven by paralleling 2 to 4 of the synthetic fibers with a weaving machine, and has a mesh length of 10 to 140 warps/10 cm and 10 to 140 wefts/10 cm.

(m) The flameproof mesh sheet of any one of (i)–(l), wherein the amount of the flame retardant for mesh sheets of any one of (a)–(g) used to impregnate multi-filament fibers or a mesh sheet fabric woven out of the multi-filament fibers is 60 to 350 parts by weight based on 100 parts by weight of the multi-filament fibers or the mesh sheet fabric.

Further objects, features, and advantages of the invention will become apparent from the detailed description that follows.

DETAILED DESCRIPTION OF PREFERRED EMBODIMENTS

An aqueous dispersion of an ethylene-vinyl acetate-acrylate copolymer is used as a base material in the present invention because a multi-filament fiber and fabric are fully impregnated with a flame retardant and uniformly coated with the flame retardant. The aqueous dispersion makes impregnation and coating easy.

The ethylene-vinyl acetate-acrylate copolymer used in the present invention advantageously comprises 2 to 30 wt % of ethylene, 40 to 88 wt % of vinyl acetate and 10 to 50 wt % of an acrylate, and the aqueous dispersion of the ethylene-vinyl acetate-acrylate copolymer preferably has a solid content of 35 to 75 wt %, a particle diameter of 0.1 to 15 $\mu$m, a viscosity of 50 to 9,000 cp and a pH of 4 to 9. Examples of useful copolymers include Polysol EF-421 and Polysol EF-221 (of Showa Polymer Co.), Sumiflex S-900, S-910, S-940 and S-820 (of Sumitomo Chemical Company, Ltd.). The acrylate is, for example, ethyl acrylate, butyl acrylate, 2-ethylhexyl acrylate, or the like. However, any acrylate can be used.

Since the ethylene-vinyl acetate-acrylate copolymer has —OCO—CH$_3$ and —COOH groups and a large amount of oxygen, its flame retarding effect is large when it is used in combination with red phosphorus and ammonium polyphosphate.

In the present invention, an aqueous dispersion of an ethylene-based α-olefin copolymer and an aqueous dispersion of a polyurethane can be used in combination with this aqueous dispersion of the ethylene-vinyl acetate-acrylate copolymer. The dispersion of the ethylene-based α-olefin copolymer used in the present invention preferably has a solid content of 20 to 45 wt %, a particle diameter of 1 to 10 $\mu$m, a pH of 8 to 11, a viscosity of 2,000 to 8,000 cp (a BM type viscometer, 6 rotations) and a resin surface hardness of A-80 to 97 (Shore A: ASTMD). The ethylene-based α-olefin copolymer is preferably a thermoplastic elastomer resin containing ethylene in an amount of 50 wt % or more, such as A-100 or A-200 (Mitsui Petrochemical Industries, Ltd.).

The aqueous dispersion of the ethylene-vinyl acetate-acrylate copolymer is excellent in flame retarding effect and keeping quality with only a small rise in viscosity due to time changes, but the feeling of a mesh sheet treated with this dispersion is slightly hard or sticky. When an aqueous dispersion of an ethylene-based α-olefin copolymer or a polyurethane dispersion is used in combination with the above dispersion to improve this, the feeling of the mesh sheet becomes soft and not sticky.

The amount of the ethylene-based α-olefin copolymer is generally 10 to 70 wt % based on 90 to 30 wt % of the solid content of the ethylene-vinyl acetate-acrylate copolymer. When the amount of the ethylene-based α-olefin copolymer is smaller than 10 wt %, the improvement of the feeling is small and when the amount is larger than 70 wt %, flameproofness deteriorates disadvantageously.

The amount of the polyurethane is generally 10 to 90 wt % based on 90 to 10 wt % of the solid content of the ethylene-vinyl acetate-acrylate copolymer. When the amount is smaller than 10 wt %, the improvements of feeling and gloss are small and when the amount is larger than 90 wt %, the effect of improving feeling is disadvantageously small.

Any desired polyurethane can be used. A polyurethane having the main structure of a polyester, polyol or polycarbonate can be used as the polyurethane. A polyurethane having the main structure of a polyester is preferred from the viewpoint of flexibility, water resistance, adhesion and the like.

The polyurethane aqueous dispersion used in the present invention preferably has a solid content of 25 to 70 wt %, a particle diameter of 0.01 to 10 $\mu$m, a viscosity of 10 to 3,000 cp and a pH of 4 to 9. Useful polyurethanes include Despacol U-42 and Despacol KA8481 of Sumitomo Viel Urethane Co., Adecabontiter HUX-380, Adecabontiter HUX-232, Adecabontiter HUX-290H, Adecabontiter HUX-350 and Adecabontiter HUX-386H of Asahi Denka Kogyo Co., Letan WB of Kansai Paint Co., and the like.

The present invention is also directed to a flame retardant comprising an aqueous dispersion of an ethylene-vinyl acetate-acrylate copolymer, an aqueous dispersion of an ethylene-based α-olefin copolymer, and an aqueous dispersion of a polyurethane. Since a flame retardant comprising these three components provides a soft and non-sticky feeling and excellent gloss, it is the most preferred flame retardant of the invention.

As for the amounts of the ethylene-based α-olefin copolymer and the polyurethane, the ethylene-based α-olefin copolymer is generally used in an amount of 10 to 50 wt % and the polyurethane is used in an amount of 10 to 70 wt % based on 80 to 10 wt % of the solid content of the ethylene-vinyl acetate-acrylate copolymer. When the amount of the ethylene-based α-olefin copolymer is smaller than 10 wt %, the improvement of feeling is small and when the amount is larger than 50 wt % and the ethylene-based α-olefin copolymer is used in combination with the polyurethane, flameproofness deteriorates disadvantageously. When the amount of the polyurethane is smaller than 10 wt %, the improvements of feeling and gloss are small and when the amount is larger than 70 wt % and the polyurethane is used in combination with the ethylene-based α-olefin copolymer, the effect of improving flameproofness is disadvantageously not seen.

The flame retardant of the present invention contains red phosphorus, generally in an amount of 1.5 to 15 parts by weight based on 100 parts by weight of the total resin solid content. When the amount of red phosphorus is smaller than 1.5 parts by weight, its flame retarding effect is small and when the amount is larger than 15 parts by weight, the product has a strong red tint disadvantageously.

Any type of red phosphorus can be used. Red phosphorus used in the present invention is preferable micro-capsulated. Use of the micro-encapsulated red phosphorus makes it possible to reduce an increase in the viscosity of an aqueous dispersion when red phosphorus is mixed into the aqueous dispersion of an olefin resin. Further, the flameproof mesh sheet is detached and washed to remove dirt after it is spread at a construction site and used for 4 to 8 months. It is washed by immersing in hot water heated at about 40° C. and containing a detergent for several hours. At this point, red phosphorus can be prevented from dissolving in water by micro-encapsulation. In the micro-capsule, the concentration of red phosphorus is generally 75 to 95% and the average particle diameter thereof is 10 to 40 um.

Micro-encapsulation can be suitably carried out by coating the surface of a red phosphorus particle with a resin or inorganic material by interfacial polymerization, coacervation, or the like.

The ammonium polyphosphate compound used in the present invention is preferably ammonium polyphosphate or amide polyphosphate; but any ammonium polyphosphate can be used. Use of micro-encapsulated ammonium polyphosphate compound makes it possible to reduce an increase in the viscosity of the aqueous dispersion when the ammonium polyphosphate compound is mixed into the aqueous dispersion of an olefin resin. Further, the flameproof mesh sheet is detached and washed to remove dirt after it is spread at a construction site and used for 4 to 8 months. It is washed by immersing in hot water heated at about 40° C. and containing a detergent. At this point, the ammonium polyphosphate compound can be made hardly soluble in water and stable by micro-encapsulation. The concentration of phosphorus contained in the ammonium polyphosphate compound is generally 15 to 35% and the average particle diameter thereof is generally 5 to 40 $\mu$m. Micro-encapsulation can be carried out in the same manner as for the red phosphorus.

The flame retardant of the present invention contains an ammonium polyphosphate compound in an amount of 10 to 70 parts by weight based on 100 parts by weight of the total resin solid content. When the amount of the ammonium polyphosphate compound is smaller than 10 parts by weight, its flame retarding effect is small and when the amount is larger than 70 parts by weight, there is no further improvement of its flame retarding effect. Therefore, it is not necessary to add a large amount of the ammonium polyphosphate compound.

Red phosphorus and an ammonium polyphosphate compound are used as flame retardants in the present invention because when a resin composition containing red phosphorus is brought close to flames, the resin and red phosphorus on the surface first burn and the resin is bonded to oxygen in the air to become carbon dioxide gas, water and carbon. In this case, red phosphorus promotes the carbonization of the ethylene-vinyl acetate-acrylate copolymer and the ethylene-based α-olefin copolymer and/or the polyurethane. Meanwhile, red phosphorus is bonded to oxygen to become an oxide which is further bonded to water to become condensation phosphoric acid. A film made from a mixture of carbon and condensation phosphoric acid formed on the surface of the resin becomes an oxygen impermeable layer, suppresses the combustion of the resin and makes the resin flame resistant. Therefore, the ethylene-vinyl acetate-acrylate copolymer containing a large amount of oxygen is effective in forming condensation red phosphoric acid.

Red phosphorus is present in an amount of 1.5 to 15 parts by weight based on 100 parts by weight of the solid content of the aqueous dispersion of the ethylene-vinyl acetate-acrylate copolymer having a solid content of 35 to 75 wt %. When the content of red phosphorus is less than 1.5 parts by weight based on the resin solid content, its flame retarding effect is not provided and when the content is more than 15 parts by weight, its flame retarding effect is not improved, and the resulting flameproof mesh sheet has a strong red tint and is difficult to be colored even with a pigment.

In this case, when an ammonium polyphosphate compound is present, it thermally decomposes at the time of combustion and generates nitrogen gas which shuts off oxygen. The ammonium polyphosphate compound promotes the carbonization of the ethylene-vinyl acetate-acrylate copolymer as a dehydrocarbonizing agent and improves a flame retarding effect while it generates nitrogen-containing gas. In the present invention, the ammonium polyphosphate compound is present in an amount of 10 to 70 parts by weight based on 100 parts by weight of the solid content of an aqueous dispersion of an ethylene-vinyl acetate-acrylate copolymer having a solid content of 35 to 75%. Below 10 parts by weight, a flame retarding effect is not provided and above 70 parts by weight, a flame retarding effect is not improved. When an ethylene-based α-olefin copolymer and/or a polyurethane are used in combination with the aqueous dispersion of the ethylene-vinyl acetate-acrylate copolymer, the above amounts of red phosphorus and ammonium polyphosphate are based on 100 parts by weight of the total resin solid content.

Nova Excel 140 or Nova Red 120 (Rin Kagaku Kogyo Co.) can be used as red phosphorus. TERRAJU-60 or TERRAJU-70 (Chisso Corp.), or Hostafuram AP462 (Hoechst Japan Co.) can be used as the ammonium polyphosphate compound.

When a metal hydroxide is further used, increased flame retarding effect is advantageously obtained. The metal hydroxide is preferably magnesium hydroxide or aluminum hydroxide which can be used in conjunction with red phosphorus and ammonium polyphosphate to obtain a greater effect; but any metal hydroxide can be used. The metal hydroxide is present in an amount of 60 to 150 parts by weight based on 100 parts by weight of the polyolefin resin solid content of the aqueous dispersion of the ethylene-vinyl acetate-acrylate copolymer.

When the amount of the metal hydroxide is smaller than 60 parts by weight based on the resin solid content, its effect of promoting flame retardancy is small and when the amount is larger than 150 parts by weight, the viscosity of the aqueous dispersion of the ethylene-vinyl acetate-acrylate copolymer increases disadvantageously.

As the aluminum hydroxide, Hijilite H-42M or Hijilite H-43M (Showa Denko K. K.) can be used. As the magnesium hydroxide, Kisuma 5 (Kyowa Kagaku Kogyo Co.) can be used.

A description is now given of a flameproof mesh sheet comprising the flame retardant of the present invention. The flame retardant composition of the invention can be used to flame retard any substance including, mesh sheets. The mesh sheets can be formed of multi-filaments.

The multi-filament used in the present invention can be at least one multi-filament selected from polyesters, nylons, polypropylene, and vinylon. It is preferably a polyester fiber to achieve desired strength and thermal shrinkage.

A high-strength and lightweight flameproof mesh sheet can be obtained by controlling the tensile strength of the multi-filament fiber to 6 to 10 g/denier. A flameproof mesh sheet having high toughness and high impact energy absorption at the time of falling can be obtained by controlling the elongation at break of the multi-filament fiber to 14 to 45%.

The multi-filament which is treated with a flame retardant and then woven preferably has an equivalent single fineness of 3 to 17 denier, preferably 3 to 12 denier, particularly preferably 4 to 9 denier and a total fineness of 500 to 4,500 denier, preferably 1,000 to 3,500 denier, particularly preferably 1,500 to 3,000 denier.

The multi-filament used in a fabric which is woven and then treated with a flame retardant preferably has an equivalent single fineness of 2 to 13 denier, preferably 2 to 11 denier, particularly preferably 2.5 to 9 denier and a total fineness of 150 to 2,500 denier, preferably 200 to 2,000 denier, particularly preferably 250 to 1,500 denier. By controlling tensile strength to 6 to 10 g/denier, a high-strength and lightweight flameproof mesh sheet can be obtained and by controlling elongation at break to 14 to 45%, a flameproof mesh sheet having high toughness and high impact energy absorption at the time of falling can be obtained.

A flameproof mesh sheet which needs to have high strength and toughness is prepared by paralleling 2 to 4 filament fibers and weaving an imitation gauze out of the fibers with a Dobby weaving machine. A scattering prevention flameproof mesh sheet is prepared by weaving a plain weave fabric out of a single filament fiber with a weaving machine in most cases. A flameproof mesh sheet for houses having a small number of stores is prepared by weaving a plain weave fabric, imitation gauze or leno weave fabric in most cases.

As for the solid content weight ratio of the flame retardant to the multi-filament fiber or fabric, the flame retardant is generally used in an amount of 60 to 350 parts by weight based on 100 parts by weight of the multi-filament fiber or fabric. When the solid content of the flame retardant is less than 60 parts by weight based on 100 parts by weight of the multi-filament fiber or fabric, coating becomes nonuniform and the multi-filament fiber or the base of the fabric is partly exposed, thereby deteriorating outer appearance and weatherability. Further, flameproofness also is reduced. When the solid content is more than 350 parts by weight, the weight of the flameproof mesh sheet increases with the result that handling properties deteriorate disadvantageously.

A pigment, dye, plasticizer, ultraviolet absorber, optical stabilizer, antioxidant, stabilizer, coupling agent, diluent, thickening agent, foaming agent, mold preventing agent, alga preventing agent and the like can be used in conjunction with the flame retardant in the present invention by suitably selecting types and amounts thereof.

A description is subsequently given of a process for producing the flameproof mesh sheet of the present invention. When the flameproof mesh sheet of the present invention is produced using a multi-filament fiber, coated yarn prepared by coating the fiber with a flame retardant through a sizing nozzle and gelling by heating is taken up by a winder. To increase the amount of the flame retardant coated on the multi-filament fiber, the multi-filament fiber is passed through the sizing nozzle at least two times to be coated with the flame retardant, gelled by heating and taken up by a winder. This coated yarn taken up by the winder is woven into a fabric by a weaving machine. This fabric is introduced into a heating furnace and heated for non-shifting processing in order to obtain gray cloth.

This cloth is cut to a predetermined size, sewed and subjected to non-shifting processing to obtain a halogen-free flameproof mesh sheet.

When the flameproof mesh sheet of the present invention is produced using a fabric, woven cloth is obtained by weaving the multi-filament fiber with a Dobby weaving machine. After this woven cloth is immersed in a tank filled with a flame retardant for mesh sheets and it passed through the tank, it is dried with an air blow, introduced into a heating furnace and gelled by heating to obtain coated cloth. To increase the amount of the flame retardant coated on the cloth, the cloth is immersed in and let pass through the tank filled with the flame retardant at least two times to produce coated cloth. The cloth is cut to a predetermined size, sewed and subjected to non-shifting processing to produce a halogen-free flameproof mesh sheet.

The invention is illustrated by the following examples, which are illustrative, but do not limit the invention.

EXAMPLE 1

200 parts by weight of the S-900, an aqueous dispersion of an ethylene-vinyl acetate-acrylate copolymer (of Sumitomo Chemical Company Ltd., having an acrylate content of 35 wt % and a solid content of 50 wt %) was injected into a planetary mixer (volume of 25 liters), and then 6 parts by weight of Nova Excel 140 red phosphorus, 40 parts by weight of TERRAJU-60 ammonium polyphosphate (of Chisso Corp.), 0.8 part by weight of Tinuabin 327 ultraviolet absorber (of Chiba Geigy Co.), 0.8 part by weight of Irganox 1010 antioxidant (of Chiba Geigy Co.), 1.0 part by weight of HALS optical stabilizer (of Chiba Geigy Co.) and 1.0 part by weight of titanium oxide were added little by little over about 5 minutes under agitation. After addition, these materials were stirred for another 20 minutes. Then, vacuum defoaming was carried out at a reduced pressure of 5 mmHg for about 30 minutes to obtain a flame retardant for mesh sheets having a viscosity of 2,470 cp (a BM type viscometer, rotor V-6, 12 rpm, 25° C.).

The flame retardant was charged into a bath, and a polyester multi-filament fiber consisting of 384 filaments and having a total fineness of 1,750 denier, an equivalent single fineness of 4.5 denier, a tensile strength of 8.5 g/denier and an elongation at break of 21% was caused to pass through a guide, pinched with a pinch roll, and further passed through a guide roll, the bath of the flame retardant and then a sizing nozzle (diameter of 0.7 mm) to be coated. Thereafter, the obtained strand was heated in a heating furnace at 140° C. and caused to pass through another sizing nozzle (diameter of 0.8 mm) to coat the multi-filament fiber. The strand was further heated in a heating furnace at 180° C. to produce coated yarn of 3,588 denier. The weight ratio of the flame retardant for mesh sheets to the multi-filament fiber was 105/100.

Thereafter, the coated yarn was woven into a mesh plain weave fabric of 52 warps/10 cm and 52 wefts/10 cm with a rapier loom at a speed of 50 cm/min. This fabric was then heated in a heating furnace at 160° C. to thermally fuse intersecting points between the warps and wefts to obtain the flameproof mesh sheet of the present invention. Further, this cloth was cut to a width of 190 cm and a length of 520 cm, sewed with a sewing machine and subjected to non-shifting processing to obtain a flameproof mesh sheet having a width of 180 cm and a length of 510 cm.

The composition of the flame retardant is shown in Table 1 and the measurement results of the properties of the flameproof mesh sheet treated with the flame retardant are shown in Table 3.

EXAMPLE 2

A flame retardant having a viscosity of 2,350 cp was obtained in the same manner as in Example 1 except that 222 parts by weight of the EF-421 ethylene-vinyl acetate-acrylate copolymer (of Showa Polymer Co., having an acrylate content of 30 wt %, an ethylene content of 15 wt % and a solid content of 40 wt %) was used in place of the S-900 ethylene-vinyl acetate-acrylate copolymer.

A multi-filament fiber of 3,000 denier was used to obtain coated yarn of 5,580 denier by using a first sizing nozzle having a diameter of 0.8 mm and a second sizing nozzle having a diameter of 0.9 mm.

A flameproof mesh sheet was obtained in the same manner as in Example 1 except that the coated yarn was formed into 30 warps/10 cm and 30 wefts/10 cm.

The composition of the flame retardant is shown in Table 1 and the measurement results of the properties of the flameproof mesh sheet treated with the flame retardant are shown in Table 3.

EXAMPLE 3

A flameproof mesh sheet was obtained in the same manner as in Example 1 except that 140 parts by weight of the S-900 ethylene-vinyl acetate-acrylate copolymer (solid content of 50 wt %) similar to that of Example 1 and 75 parts by weight of the A-100 ethylene-based α-olefin copolymer (of Mitsui Petrochemical Industries, Ltd., having a solid content of 40 wt %) were used. The composition of the flame retardant is shown in Table 1 and the measurement results of the properties of the flameproof mesh sheet treated with the flame retardant are shown in Table 3.

EXAMPLE 4

A flameproof mesh sheet was obtained in the same manner as in Example 1 except that 60 parts by weight of the S-900 ethylene-vinyl acetate-acrylate copolymer (solid content of 50 wt %) similar to that of Example 1 and 140 parts by weight of the Despacol U-42 polyurethane (of Sumitomo Viel Urethane Co., having the main structure of a polyester and a solid content of 50 wt %) were used.

The composition of the flame retardant is shown in Table 1 and the measurement results of the properties of the flameproof mesh sheet treated with the flame retardant are shown in Table 3.

EXAMPLE 5

Coated yarn of 3,935 denier was obtained in the same manner as in Example 1 except that 60 parts by weight of the S-900 ethylene-vinyl acetate-acrylate copolymer (solid content of 50 wt %), 75 parts by weight of the A-100 ethylene-based α-olefin copolymer (of Mitsui Petrochemical Industries, Ltd., having a solid content of 40 wt %), and 105 parts by weight of the Adecabontine HUX-380 polyurethane aqueous dispersion (of Asahi Denka Kogyo Co., having the main structure of a polyester and a solid content of 38 wt %) were used. A flameproof mesh sheet was obtained in the same manner as in Example 1 except that it was woven out of 20 warps/10 cm and 20 wefts/10 cm formed of the above coated yarn.

The composition of the flame retardant is shown in Table 2 and the measurement results of the properties of the flameproof mesh sheet treated with the flame retardant are shown in Table 4.

EXAMPLE 6

A flame retardant for mesh sheets was obtained in the same manner as in Example 1 except that 111 parts by weight of the EF-421 ethylene-vinyl acetate-acrylate copolymer (of Showa Polymer Co., having an acrylate content of 30 wt %, an ethylene content of 15 wt % and a solid content of 45 wt %) and 167 parts by weight of the Adecabontiter HUX-350 polyurethane aqueous dispersion (of Asahi Denka Kogyo Co., having the main structure of a polyester and a solid content of 30 wt %) were used in place of the S-900 ethylene-vinyl acetate-acrylate copolymer (solid content of 50 wt %), and 40 parts by weight of the HUZ-XW-3 Hostafuram AP-462 curing agent (Hoechst Japan Co.) was used in place of the TERRAJU-60 ammonium polyphosphate. The composition of the flame retardant is shown in Table 2.

An imitation gauze fabric of 45 warps/10 cm and 45 wefts/10 cm was woven with a Dobby weaving machine by paralleling 3 multi-filament fibers of 750 denier to coat the fabric and not the multi-filament fibers in Example 1. The weight of the fabric was 225 g/m².

Thereafter, the fabric was caused to pass through a guide roll into a tank filled with the flame retardant, pinched with a pinch roll, pass into the flame retardant in the tank through a guide roll, squeezed with a squeezing roll and dried with an air blow to remove the flame retardant filled in the weave of the fabric, and gelled in a heating furnace having a temperature gradient of 130° C., 160° C. and 180° C., and the coated cloth was taken up by a winder. The coated cloth was caused to pass through a tank filled with the flame retardant and the same procedure was repeated twice to obtain coated cloth having a coating amount of 429 g/m² (mesh sheet cloth). The cloth was cut to a predetermined size, sewed and subjected to non-shifting processing to obtain a flameproof mesh sheet. The properties of the mesh sheet are shown in Table 4.

EXAMPLE 7

An imitation gauze of 120 warps/10 cm and 120 wefts/10 cm was woven with a weaving machine by plain weaving multi-filament fibers of 250 denier to coat the fabric and not the multi-filament fibers in the same manner as in Example 6. The weight of the coated fabric was 66 g/m².

The fabric was coated with the same flame retardant as in Example 6 in the same manner as in Example 6 and gelled by heating, and the coated cloth having a weight of 127 g/m² was taken up by a winder.

This coated cloth was cut to a predetermined size, sewed and subjected to non-shifting processing to obtain a scattering prevention flameproof mesh sheet.

The composition of the flame retardant used is shown in Table 2 and the measurement results of the properties of the scattering prevention flameproof mesh sheet treated with the flame retardant are shown in Table 4.

EXAMPLE 8

A flame retardant for mesh sheets was produced in the same manner as in Example 1 except that 100 parts by weight of the S-900 ethylene-vinyl acetate-acrylate copolymer (solid content of 50 wt %), 161 parts by weight of the Adecabontiter HUX-386 polyurethane aqueous dispersion (having the main structure of a polycarbonate and a solid content of 31 wt %), 3 parts by weight of the Nova Red 120 red phosphorus, 40 parts by weight of the Hostafuram AP-462 ammonium polyphosphate and 100 parts by weight of the Hijilite H-42H aluminum hydroxide were added.

A flameproof mesh sheet was obtained in the same manner as in Example 1 except that the above flame retardant was used.

The composition of the flame retardant used is shown in Table 2 and the measurement results of the properties of the flameproof mesh sheet treated with the flame retardant are shown in Table 4.

EXAMPLE 9

A flame retardant for mesh sheets was produced in the same manner as in Example 1 except that 100 parts by weight of the S-900 ethylene-vinyl acetate-acrylate copolymer (solid content of 50 wt %), 161 parts by weight of the Adecabontiter HUX-386 polyurethane aqueous dispersion (having the main structure of a polycarbonate and a solid content of 31 wt %), 12 parts by weight of the Nova Red 120 red phosphorus, 20 parts by weight of the Hostafuram AP-462 ammonium polyphosphate and 100 parts by weight of the Kisuma-5 magnesium hydroxide were added and 10 parts by weight of isopropyl alcohol was further added.

The composition of the flame retardant is shown in Table 2 and a flameproof mesh sheet was obtained in the same manner as in Example 1 except that the above flame retardant was used.

The measurement results of the properties of the flameproof mesh sheet are shown in Table 4.

COMPARATIVE EXAMPLE 1

A flame retardant having a viscosity of 2,420 cps was obtained in the same manner as in Example 1 except that the amount of the Nova Excel 140 red phosphorus was changed to 1.0 part by weight. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 7.

COMPARATIVE EXAMPLE 2

A flame retardant having a viscosity of 2,370 cps was obtained in the same manner as in Example 1 except that the amount of the Nova Excel 140 red phosphorus was changed to 12 parts by weight and the amount of the TERRAJU-60 ammonium polyphosphate was changed to 8 parts by weight. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 7.

COMPARATIVE EXAMPLE 3

A flame retardant having a viscosity of 2,890 cps was obtained in the same manner as in Example 1 except that red phosphorus was not used and 25 parts by weight of antimony trioxide was used. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 7.

COMPARATIVE EXAMPLE 4

A flame retardant having a viscosity of 2,130 cps was obtained in the same manner as in Example 1 except that ammonium polyphosphate was not used and 25 parts by weight of antimony trioxide was used. A flameproof mesh sheet was produced in the same manner as in Example 1 except that the above flame retardant was used.

The composition of the flame retardant is shown in Table 6 and the measurement results of the properties of the flameproof mesh sheet treated with the flame retardant are shown in Table 8.

COMPARATIVE EXAMPLE 5

A flame retardant having a viscosity of 2,280 cps was obtained in the same manner as in Example 1 except that red phosphorus and ammonium polyphosphate were not used, and 25 parts by weight of antimony trioxide and 30 parts by weight of decabromodiphenyl oxide were used. A flameproof mesh sheet was produced in the same manner as in Example 1 except that the above flame retardant was used.

The composition of the flame retardant is shown in Table 6 and the measurement results of the properties of the flameproof mesh sheet treated with the flame retardant are shown in Table 8.

COMPARATIVE EXAMPLE 6

Coated yarn of 2,573 denier was obtained by coating a multi-filament fiber using a 0.6 mm-diameter sizing nozzle in place of the 0.7 mm-diameter sizing nozzle in Example 1. A flameproof mesh sheet was produced in the same manner as in Example 1 except that the coated yarn which was not coated with the flame retardant twice was used.

The composition of the flame retardant is shown in Table 6 and the measurement results of the properties of the flameproof mesh sheet treated with the flame retardant are shown in Table 8.

The flameproof mesh sheet of the present invention does not generate harmful halogen gas at the time of combustion and is excellent in flame retardancy and satisfactory in terms of drop impact strength.

Japanese application 9-369954 filed Dec. 18, 1997, for which priority under § 119 is claimed, is incorporated herein by reference in its entirety.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

TABLE 1

| | solid content % | Example 1 | Example 2 | Example 3 | Example 4 |
|---|---|---|---|---|---|
| ethylene-vinyl acetate-acrylate copolymer | | | | | |
| S-900 | 50 | 200 | | 140 | 60 |
| EF-421 | 40 | | 222 | | |
| ethylene-α-olefin copolymer | | | | | |
| A-100 | 40 | | | 75 | |
| polyurethane | | | | | |
| Despacol U-42 | 50 | | | | 140 |
| Adecabontiter HUX-380 | 38 | | | | |
| Adecabontiter HUX-350 | 30 | | | | |
| Adecabontiter HUX-386 | 31 | | | | |
| aqueous dispersion resin solid content (parts by weight) | | 100 | 100 | 100 | 100 |
| red phosphorus Nova Excel 140 | | | | | |
| red phosphorus Nova Red 120 | | 6 | 6 | 6 | 6 |
| ammonium polyphosphate A | | 40 | 40 | 40 | 40 |
| ammonium polyphosphate B | | | | | |
| aluminum hydroxide C | | | | | |
| magnesium hydroxide D | | | | | |
| isopropyl alcohol | | | | | |
| viscosity of aqueous dispersion (CP) | | 2470 | 2350 | 3810 | 3290 |

TABLE 2

| | Example 5 | Example 6 | Example 7 | Example 8 | Example 9 |
|---|---|---|---|---|---|
| ethylene-vinyl acetate-acrylate copolymer | | | | | |
| S-900 | 60 | | | 100 | 100 |
| EF-421 | | 111 | 111 | | |
| ethylene-α-olefin copolymer | | | | | |
| A-100 | 75 | | | | |
| polyurethane | | | | | |
| Despacol U-42 | | | | | |
| Adecabontiter HUX-380 | 105 | | | | |
| Adecabontiter HUX-350 | | 167 | 167 | | |
| Adecabontiter HUX-386 | | | | 161 | 161 |
| aqueous dispersion resin solid content (parts by weight) | 100 | 100 | 100 | 100 | 100 |
| red phosphorus Nova Excel 140 | | 6 | 6 | | |
| red phosphorus Nova Red 120 | 6 | | | 3 | 12 |
| ammonium polyphosphate A | 40 | | | 40 | 20 |
| ammonium polyphosphate B | | 40 | 40 | | |
| aluminum hydroxide C | | | | 100 | |
| magnesium hydroxide D | | | | | 100 |
| isopropyl alcohol | | | | 10 | 10 |
| viscosity of aqueous dispersion (CP) | 2960 | 2580 | 2580 | 3170 | 3420 |

TABLE 3

| | solid content % | Example 1 | Example 2 | Example 3 | Example 4 |
|---|---|---|---|---|---|
| fineness of multi-filament fiber (De) | | 1750 | 3000 | 1750 | 1750 |
| fabric number of warps/10 cm | | 52 | 30 | 52 | 52 |
| number of wefts/10 cm | | 52 | 30 | 52 | 52 |
| weight of fabric (g/m$^2$) | | | | | |
| fineness of coated yarn (De) | | 3588 | 5580 | 5176 | 4200 |
| weight of coated fabric (g/m$^2$) | | | | | |
| flame retardant for mesh sheets/multi-filament fiber or fabric | | 105/100 | 86/100 | 193/100 | 140/100 |

TABLE 3-continued

| | solid content % | Example 1 | Example 2 | Example 3 | Example 4 |
|---|---|---|---|---|---|
| combustion test | | | | | |
| 1) two minutes or 1 minute of combustion carbonization area (cm$^2$) | | 7 | 12 | 10 | 8 |
| afterflame time (seconds) | | 0 | 2 | 1 | 0 |
| afterglow time (seconds) | | 0 | 3 | 2 | 0 |
| 2) 6 seconds or 3 seconds after catching fire carbonization area (cm$^2$) | | 8 | 15 | 13 | 8 |
| afterflame time (seconds) | | 1 | 2 | 3 | 2 |
| afterglow time (seconds) | | 1 | 4 | 2 | 1 |
| 3) number of times of flame contact (time) | | 5 | 4 | 4 | 5 |
| amount of halogen gas (HBr) (mg/g) | | 0 | 0 | 0 | 0 |
| tensile strength (warp/weft) (kg/3 cm) | | 214/214 | 212/215 | 213/212 | 213/214 |
| tensile elongation (warp/weft) (kg/3 cm) | | 23/24 | 25/23 | 23/25 | 22/23 |
| toughness (warp/weft) | | 9844/10272 | 16000/9890 | 9372/10600 | 9372/9844 |
| drop impact strength (penetration test) m | | 7 | 8 | 7 | 6 |

TABLE 4

| | Example 5 | Example 6 | Example 7 | Example 8 | Example 9 |
|---|---|---|---|---|---|
| fineness of multi-filament fiber (De) | 1750 | | | 1750 | 1750 |
| fabric number of warps/10 cm | 20 | 45 | 120 | 52 | 52 |
| number of wefts/10 cm | 20 | 45 | 120 | 52 | 52 |
| weight of fabric (g/m$^2$) | 90 | 225 | 66 | | |
| fineness of coated yarn (De) | 3935 | | | 4110 | 4340 |
| weight of coated fabric (g/m$^2$) | | 429 | 127 | | |
| flame retardant for mesh sheets/multi filament fiber or fabric | 125/100 | 91/100 | 92/100 | 135/100 | 148/100 |
| combustion test | | | | | |
| 1) two minutes or 1 minute of combustion carbonization area (cm$^2$) | 11 | 12 | 9 | 8 | 9 |
| afterflame time (seconds) | 1 | 3 | 1 | 0 | 1 |
| afterglow time (seconds) | 2 | 2 | 0 | 1 | 0 |
| 2) 6 seconds or 3 seconds after catching fire carbonization area (cm$^2$) | 10 | 12 | 10 | 9 | 10 |
| afterflame time (seconds) | 2 | 2 | 0 | 2 | 1 |
| afterglow time (seconds) | 3 | 3 | 2 | 0 | 3 |
| 3) number of times of flame contact (time) | 4 | 4 | 4 | 4 | 4 |
| amount of halogen gas (HBr) (mg/g) | 0 | 0 | 0 | 0 | 0 |
| tensile strength (warp/weft) (kg/3 cm) | 95/93 | 213/210 | 64/64 | 212/213 | 210/212 |
| tensile elongation (warp/weft) (kg/3 cm) | 23/25 | 23/23 | 23/24 | 22/24 | 23/24 |
| toughness (warp/weft) | 4370/4650 | 9798/9660 | 2944/3072 | 9328/10224 | 9660/10176 |
| drop impact strength (penetration test) m | 4 | 6 | 2 | 6 | 6 |

TABLE 5

| | solid content % | Comparative Example 1 | Comparative Example 2 | Comparative Example 3 |
|---|---|---|---|---|
| ethylene-vinyl acetate-acrylate copolymer | | | | |
| S-900 | 50 | 200 | 200 | 200 |
| EF-421 | 45 | | | |
| EF-221 | 45 | | | |

TABLE 5-continued

| | solid content % | Comparative Example 1 | Comparative Example 2 | Comparative Example 3 |
|---|---|---|---|---|
| polyurethane | | | | |
| Despacol U-42 | 50 | | | |
| Adecabontiter HUX-380 | 38 | | | |
| Adecabontiter HUX-350 | 30 | | | |
| Adecabontiter HUX-386 | 31 | | | |
| aqueous dispersion resin solid content (parts by weight) | | 100 | 100 | 100 |
| decabromodiphenyl oxide | | | | |
| antimony trioxide | | | | 25 |
| red phosphorus Nova Excel 140 | | | | |
| red phosphorus Nova Red 120 | | 1 | 12 | |
| ammonium polyphosphate A | | | | |
| ammonium polyphosphate B | | 40 | 8 | 40 |
| aluminum hydroxide C | | | | |
| magnesium hydroxide D | | | | |
| isopropyl alcohol | | | | |
| viscosity of aqueous dispersion (CP) | | 2420 | 2370 | 2890 |

TABLE 6

| | Comparative Example 4 | Comparative Example 5 | Comparative Example 6 |
|---|---|---|---|
| ethylene-vinyl acetate-acrylate copolymer | | | |
| S-900 | 200 | 200 | 200 |
| EF-421 | | | |
| EF-221 | | | |
| polyurethane | | | |
| Despacol U-42 | | | |
| Adecabontiter HUX-380 | | | |
| Adecabontiter HUX-350 | | | |
| Adecabontiter HUX-386 | | | |
| aqueous dispersion resin | 100 | 100 | 100 |
| solid content (parts by weight) | | | |
| decabromodiphenyl oxide | | 30 | |
| antimony trioxide | 25 | 25 | |
| red phosphorus Nova Excel 140 | | | |
| red phosphorus Nova Red 120 | 6 | | 6 |
| ammonium polyphosphate A | | | |
| ammonium polyphosphate B | | | 40 |
| aluminum hydroxide C | | | |
| magnesium hydroxide D | | | |
| isopropyl alcohol | | | |
| viscosity of aqueous dispersion (CP) | 2130 | 2280 | 2470 |

TABLE 7

| | solid content % | Comparative Example 1 | Comparative Example 2 | Comparative Example 3 |
|---|---|---|---|---|
| fineness of multi-filament fiber (De) | | 1750 | 1750 | 1750 |
| fabric number of warps/10 cm | | 52 | 52 | 52 |
| number of wefts/10 cm | | 52 | 52 | 52 |
| weight of fabric (g/m$^2$) | | | | |
| fineness of coated yarn (De) | | 3546 | 3620 | 4230 |
| weight of coated fabric (g/m$^2$) | | | | |
| flame retardant for mesh sheets/multi-filament fiber or fabric combustion test | | 103/100 | 107/100 | 142/100 |
| 1) two minutes or 1 minute of combustion carbonization area (cm$^2$) afterflame time (seconds) afterglow time (seconds) | | totally burnt | totally burnt | totally burnt |
| 2) 6 seconds or 3 seconds after catching fire carbonization | | totally burnt | totally burnt | totally burnt |

TABLE 7-continued

|  | solid content % | Comparative Example 1 | Comparative Example 2 | Comparative Example 3 |
|---|---|---|---|---|
| area (cm²) |  |  |  |  |
| afterflame time (seconds) |  |  |  |  |
| afterglow time (seconds) |  |  |  |  |
| 3) number of times of flame contact (time) |  |  |  |  |
| amount of halogen gas (HBr) (mg/g) |  | 0 | 0 | 0 |
| tensile strength (warp/weft) (kg/3 cm) |  | 213/214 | 212/214 | 214/212 |
| tensile elongation (warp/weft) (kg/3 cm) |  | 24/23 | 24/22 | 23/23 |
| toughness (warp/weft) |  | 10224/10272 | 10176/9416 | 9844/9752 |
| drop impact strength (penetration test) m |  |  |  |  |

TABLE 8

|  | Comparative Example 4 | Comparative Example 5 | Comparative Example 6 |
|---|---|---|---|
| fineness of multi-filament fiber (De) | 1750 | 1750 | 1750 |
| fabric number of warps/10 cm | 52 | 52 | 52 |
| number of wefts/10 cm | 52 | 52 | 52 |
| weight of fabric (g/m²) |  |  |  |
| fineness of coated yarn (De) | 4570 | 4380 | 2610 |
| weight of coated fabric (g/m²) |  |  |  |
| flame retardant for mesh sheets/multifilament fiber or fabric combustion test | 161/100 | 150/100 | 49/100 |
| 1) two minutes or 1 minute of combustion carbonization area (cm²) | totally burnt | 6 | totally burnt |
| afterflame time (seconds) |  | 0 |  |
| afterglow time (seconds) |  | 0 |  |
| 2) 6 seconds or 3 seconds after catching fire carbonization area (cm²) | totally burnt | 8 | totally burnt |
| afterflame time (seconds) |  | 1 |  |
| afterglow time (seconds) |  | 1 |  |
| 3) number of times of flame contact (time) |  | 4 |  |
| amount of halogen gas (HBr) (mg/g) | 0 | 33 | 0 |
| tensile strength (warp/weft) (kg/3 cm) | 210/214 | 212/210 | 210/213 |
| tensile elongation (warp/weft) (kg/3 cm) | 24/23 | 22/24 | 24/23 |
| toughness (warp/weft) | 10080/9844 | 9328/10080 | 10080/9798 |
| drop impact strength (penetration test) m |  | 7 |  |

Notes on Table (1) The amount of each material is expressed in parts by weight based on 100 parts by weight of a resin solid content.
(2) The unit of numerical values of the coated fabrics of Examples 6 and 7 is g/m².
(3) The fineness of a multi-filament fiber x the number of the fibers in Examples 6 and 7 are 750×3 and 250×1, respectively.
(4) The combustion tests of Examples 1, 5, 6 and 7 and Comparative Examples 1, 2 and 6 were based on A-1 method in which heating was carried out for 1 minute and flames were produced after 3 seconds.
(5) A is TERRAJU-60 (of Chisso Corp.).
(6) B is Hostafuram AP 462 (of Hoechst Japan Limited).
(7) C is Hijilite H-42M (of Showa Denko Co.).
(8) D is Kisuma-5 (of Kyowa Kagaku Co.).
(9) The figures in the column of the fineness (De) of the coated yarn and the coated fabric are for coated fabrics in Examples 6 and 7 and coated yarn in other examples.

Properties were measured as follows:

1. viscosity measurement method
   BM type viscometer rotor No. 6, revolution of 12 rpm, 25° C.
2. combustion test
   measured in accordance with JIS L-1091
   A-1 method (45° C., micro-burner method)
   A-2 method (45° C., meckel burner method)
   D method (number of times of flame contact)
3. tensile strength test measured in accordance with JIS L-1068
4. amount of HBr gas generated
   0.5 g of a sample was taken. This sample was placed in a combustion tube, preheated at 350 to 400° C. for 5 minutes and postheated at 800±30° C. for 30 minutes, and a combustion gas was collected into a flask tilled with a 1/10 N NaOH solution. The quantity of HBr contained in the solution was determined by ion chromatography.
5. drop impact strength (penetration test)
   measured in accordance with JIS-8952.

A steel tube having an outer diameter of 48.6 mm, a thickness of 2.5 mm and a weight of 2.7 kg was used in this test in the case of a flameproof mesh sheet for houses having a small number of stories and scattering prevention flameproof mesh sheet.

We claim:

1. A flame retardant useful for mesh sheets comprising a halogen free aqueous dispersion of an ethylene-vinyl acetate-acrylate copolymer, red phosphorus in an amount of 1.5 to 15 parts by weight and an ammonium polyphosphate compound in an amount of 10 to 70 parts by weight, based on 100 parts by weight of the solid content of the aqueous dispersion of the ethylene-vinyl acetate-acrylate copolymer, wherein the copolymer has an ethylene content of 2 to 30 wt %, a vinyl acetate content of 40 to 88 wt %, an acrylate content of 10 to 50 wt %, and a resin solid content of 35 to 75 wt %.

2. A flame retardant useful for mesh sheets prepared by mixing a halogen free aqueous dispersion of an ethylene-based α-olefin copolymer having a resin solid content of 20 to 45 wt % with an aqueous dispersion of a halogen free ethylene-vinyl acetate-acrylate copolymer having an ethylene content of 2 to 30 wt %, a vinyl acetate content of 40 to 88, an acrylate content of 10 to 50 wt % and a resin solid content of 35 to 75 wt %, in a solid content weight ratio of 10:90 to 70:30, and adding red phosphorus in an amount of 1.5 to 15 parts by weight and an ammonium polyphosphate compound in an amount of 10 to 70 parts by weight, based on 100 parts by weight of the total resin solid content.

3. A flame retardant useful for mesh sheets prepared by mixing a halogen free aqueous dispersion of a polyurethane having a resin solid content of 25 to 75 wt % with a halogen free aqueous dispersion of an ethylene-vinyl acetate-acrylate copolymer having an ethylene content of 2 to 30 wt %, a vinyl acetate content of 40 to 88 wt %, an acrylate content of 10 to 50 wt % and a resin solid content of 35 to 75 wt %, in a solid content weight ratio of 10:90 to 90:10, and adding red phosphorus in an amount of 1.5 to 15 parts by weight and an ammonium polyphosphate compound in an amount of 10 to 70 parts by weight, based on 100 parts by weight of the total resin solid content.

4. A flame retardant useful for mesh sheets prepared by mixing a halogen free aqueous dispersion of an ethylene-based α-olefin copolymer having a resin solid content of 20 to 45 wt % and a halogen free aqueous dispersion of a polyurethane having a resin solid content of 25 to 75 wt % with a halogen free aqueous dispersion of an ethylene-vinyl acetate-acrylate copolymer having an ethylene content of 2 to 30 wt %, a vinyl acetate content of 40 to 88 wt %, an acrylate content of 10 to 50 wt % and a resin solid content of 35 to 75 wt %, in a solid content weight ratio of 10:10:80 to 50:70:10 and adding red phosphorus in an amount of 1.5 to 15 parts by weight and an ammonium polyphosphate compound in an amount of 10 to 70 parts by weight, based on 100 parts by weight of the total resin solid content.

5. A flame retardant of any of claims 1 to 4, wherein the red phosphorus is microcapsulated.

6. A flame retardant of any of claims 1 to 4, wherein the ammonium polyphosphate compound is micro-capsulated.

7. A flame retardant of claim 1, which further comprises a metal hydroxide in an amount of 60 to 150 parts by weight, based on 100 parts by weight of the solid content of the aqueous dispersion resin.

8. A flame retardant of claim 7, wherein the metal hydroxide is one or more of magnesium hydroxide and aluminum hydroxide.

9. A flameproof mesh sheet woven out of coated yarn which is impregnated with the flame retardant of claim 1, and heated.

10. A flameproof mesh sheet of claim 9, wherein the coated yarn is a multi-filament fiber having an equivalent single fineness of 3 to 17 denier, a total fineness of 500 to 4,500 denier, a tensile strength of 6 to 10 g/denier, and an elongation at break of 14 to 45%.

11. A flameproof mesh sheet prepared by impregnating a mesh sheet fabric woven out of multi-filament fibers with the flame retardant of claim 1, and heating.

12. A flameproof mesh sheet of claim 11, wherein the mesh sheet fabric woven out of multi-filament fibers is a plain weave fabric woven out of synthetic fibers having an equivalent single fineness of 2 to 13 denier, a total fineness of 150 to 2,500 denier, a tensile strength 6 to 10 g/denier and an elongation at break of 14 to 45%, or is leno weave fabric or imitation gauze woven by paralleling 2 to 4 of the synthetic fibers with a weaving machine, and has a mesh length of 10 to 140 warps/10 cm and 10 to 140 wefts/10 cm.

13. A flameproof mesh sheet of claim 9, wherein the amount of the flame retardant used to impregnate the coated yarn is 60 to 350 parts by weight based on 100 parts by weight of the coated yarn.

14. A mesh sheet treated with the flame retardant of any of claims 1 to 4.

* * * * *